UNITED STATES PATENT OFFICE.

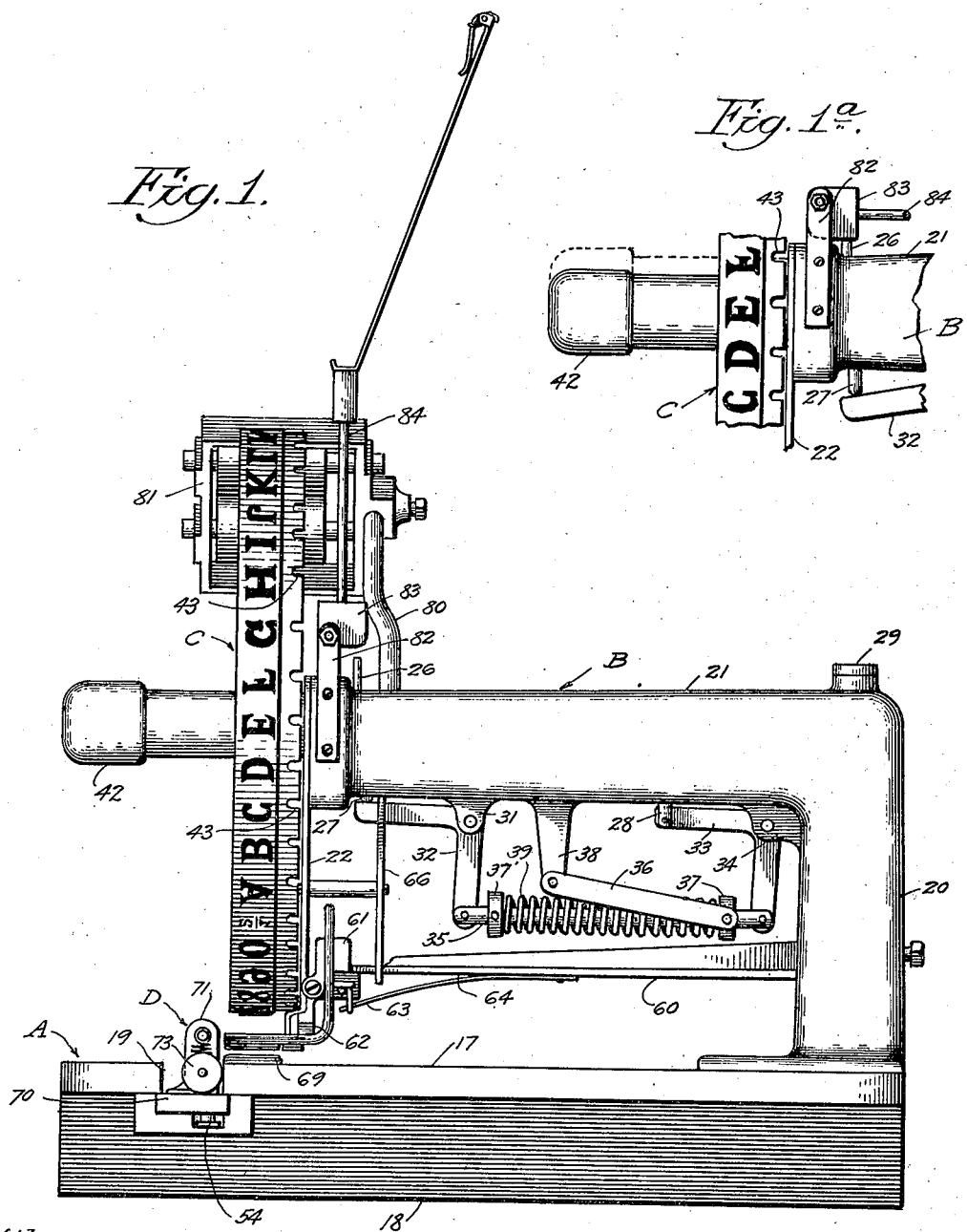

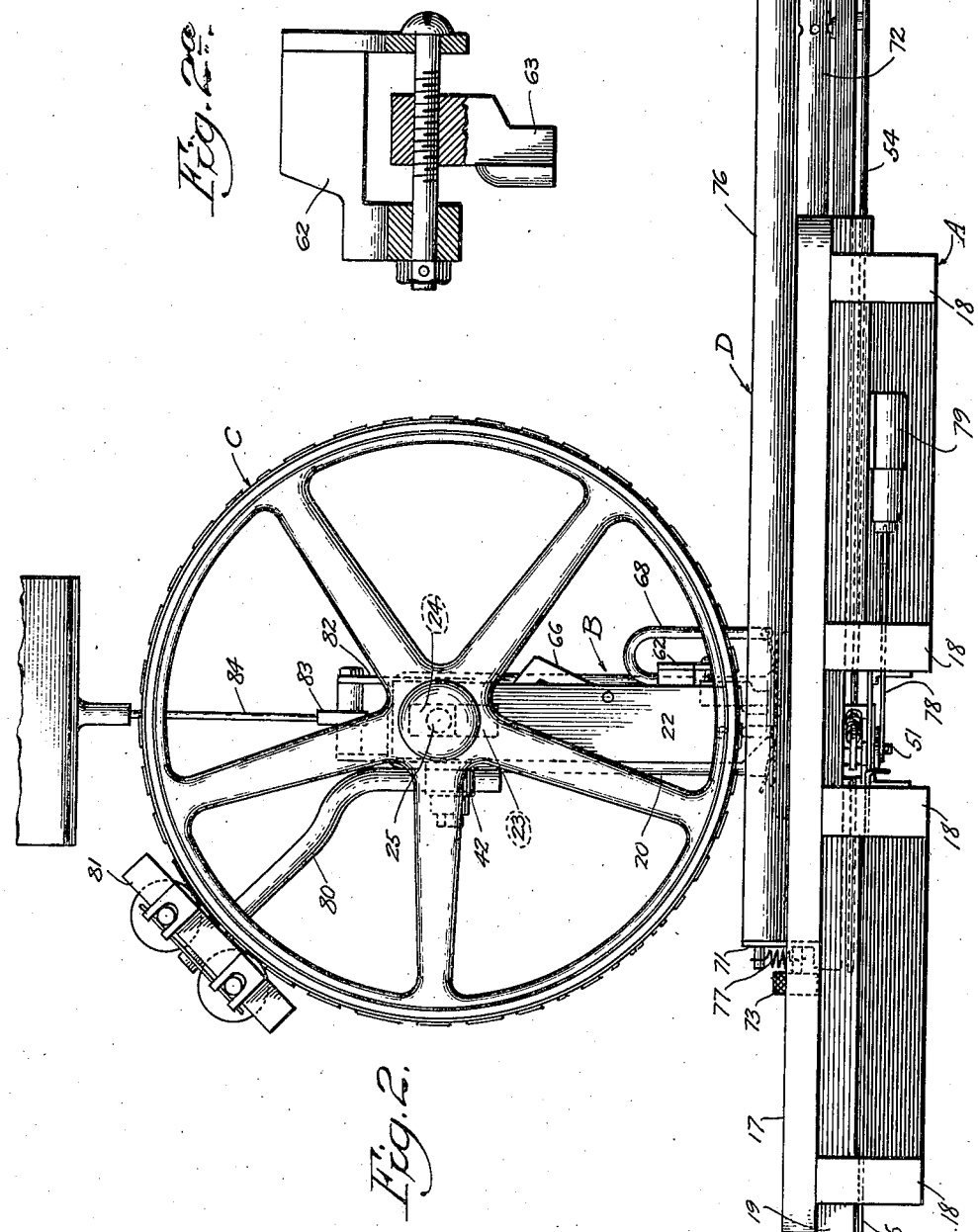

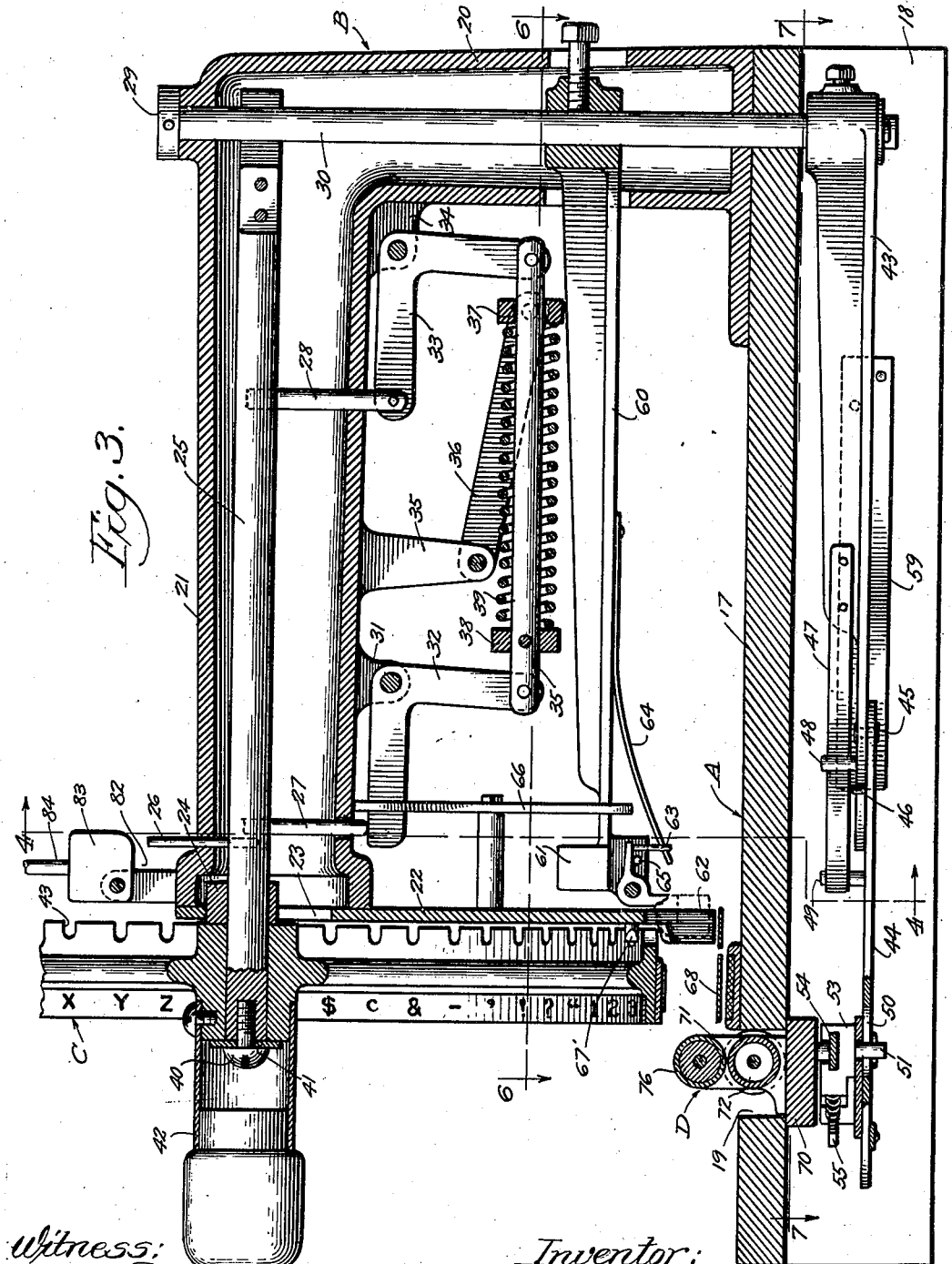

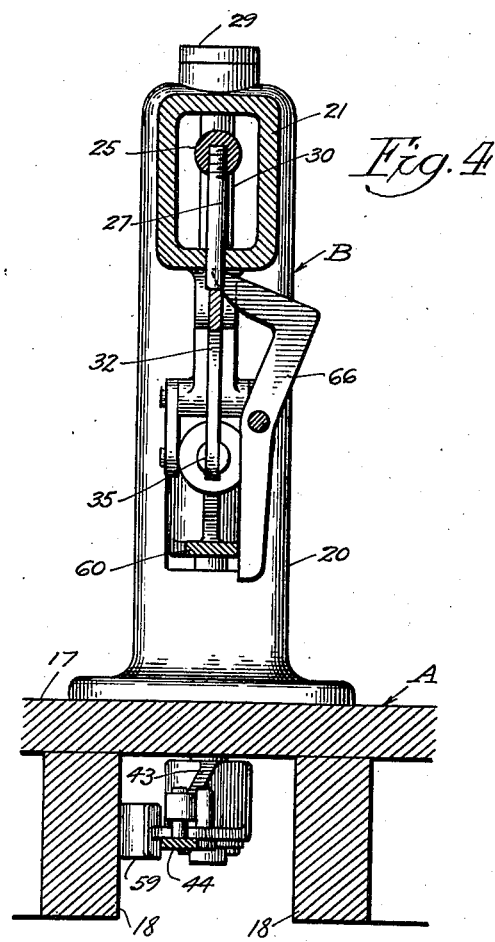
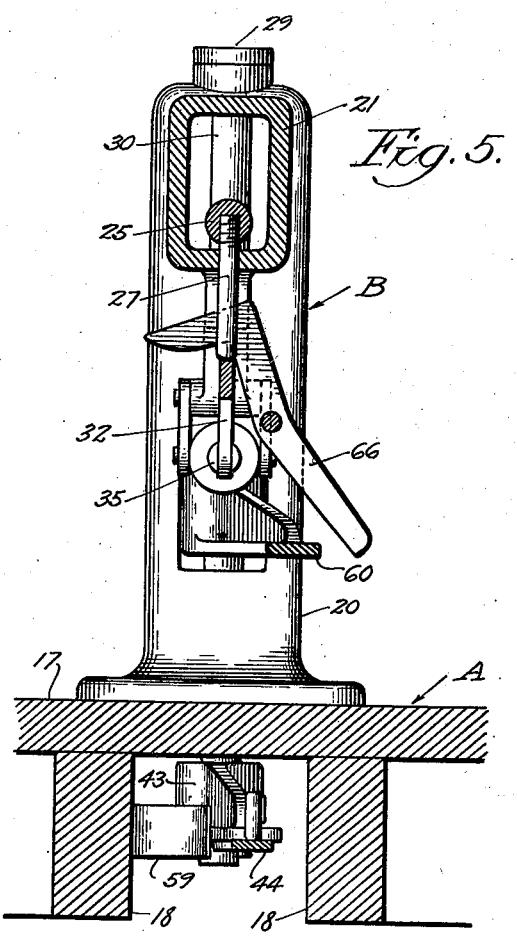
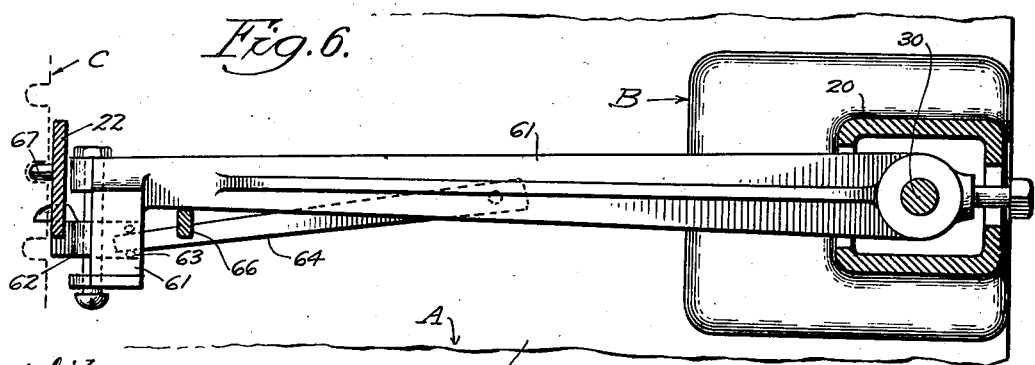

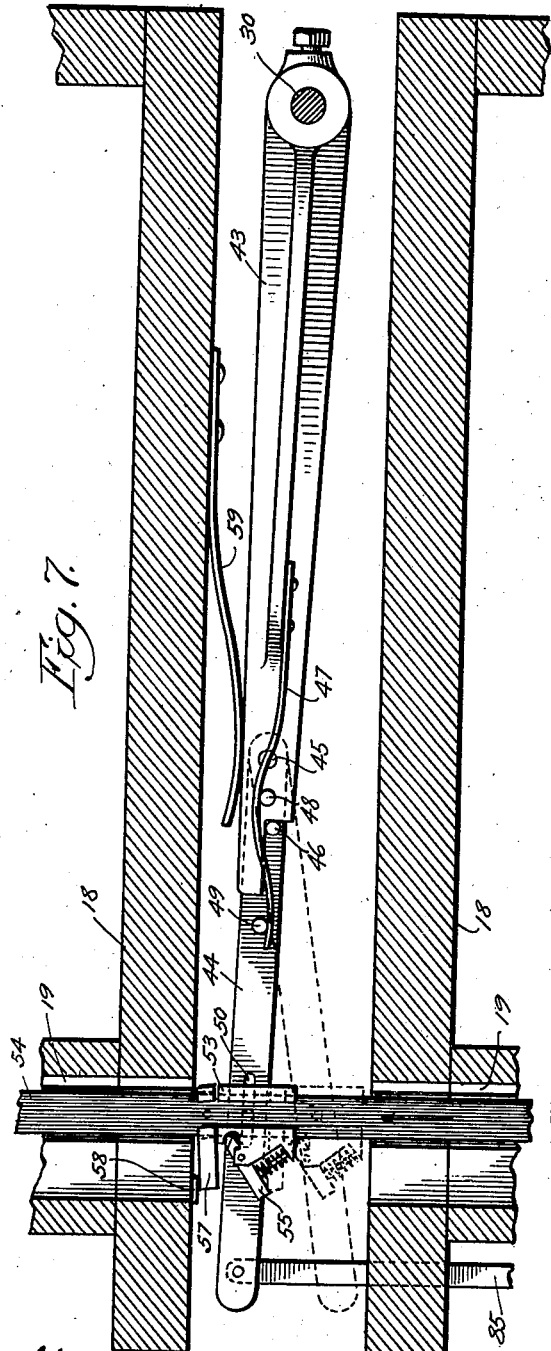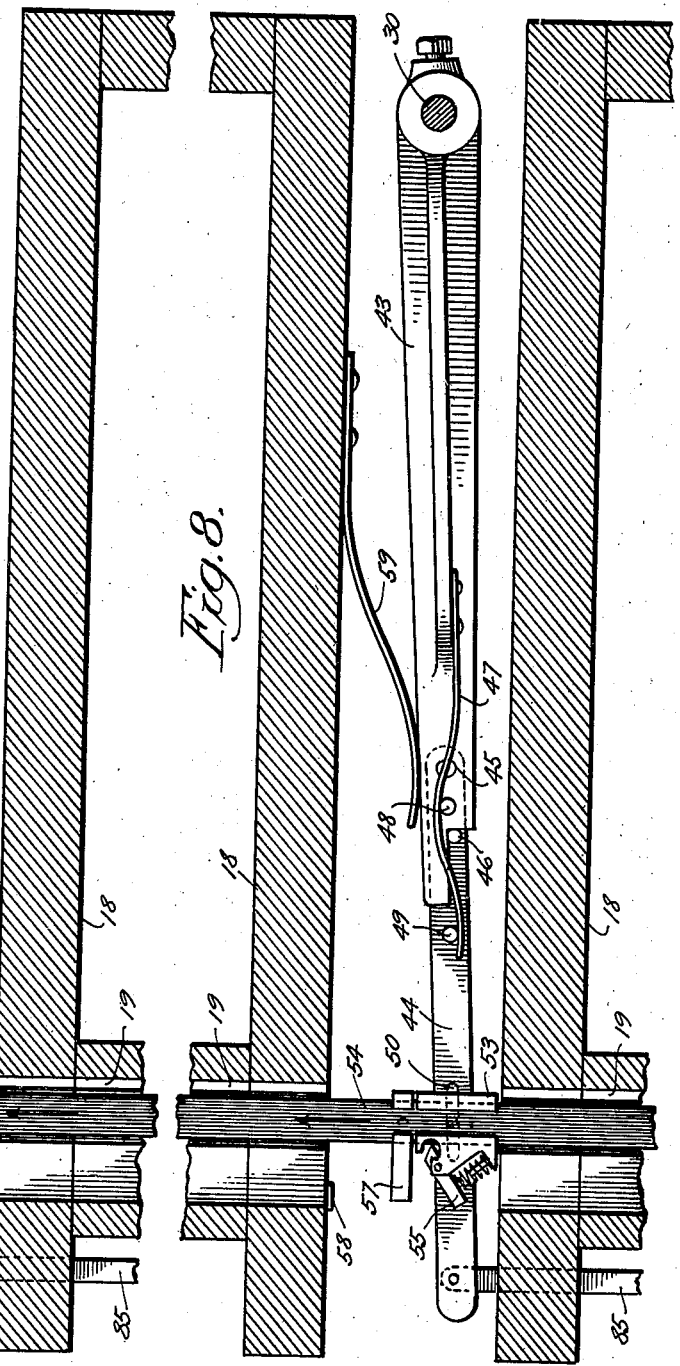

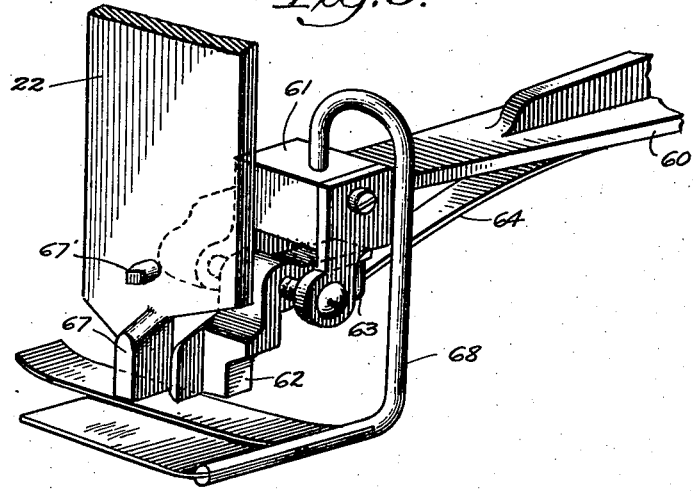
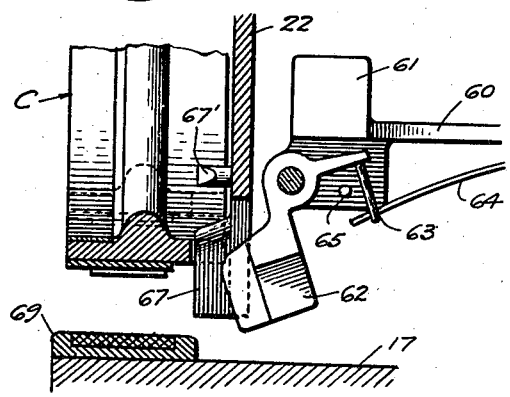
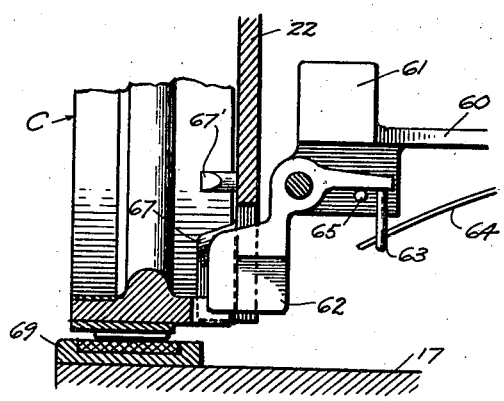

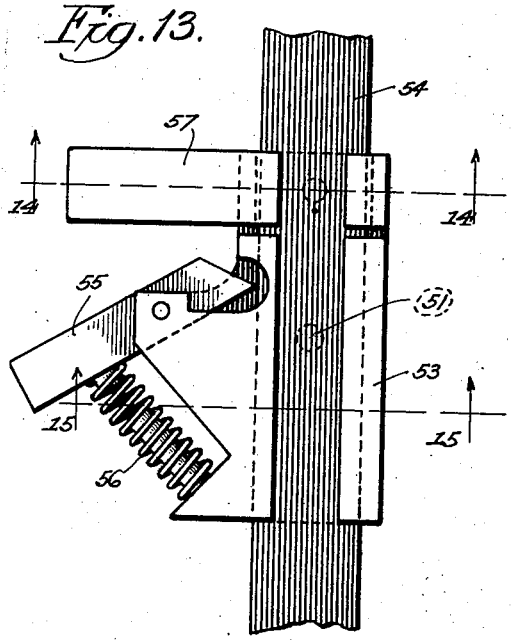
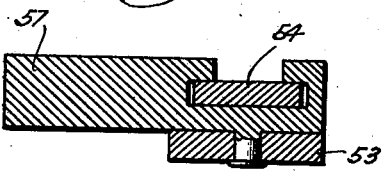
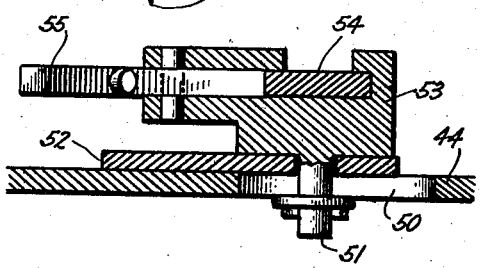
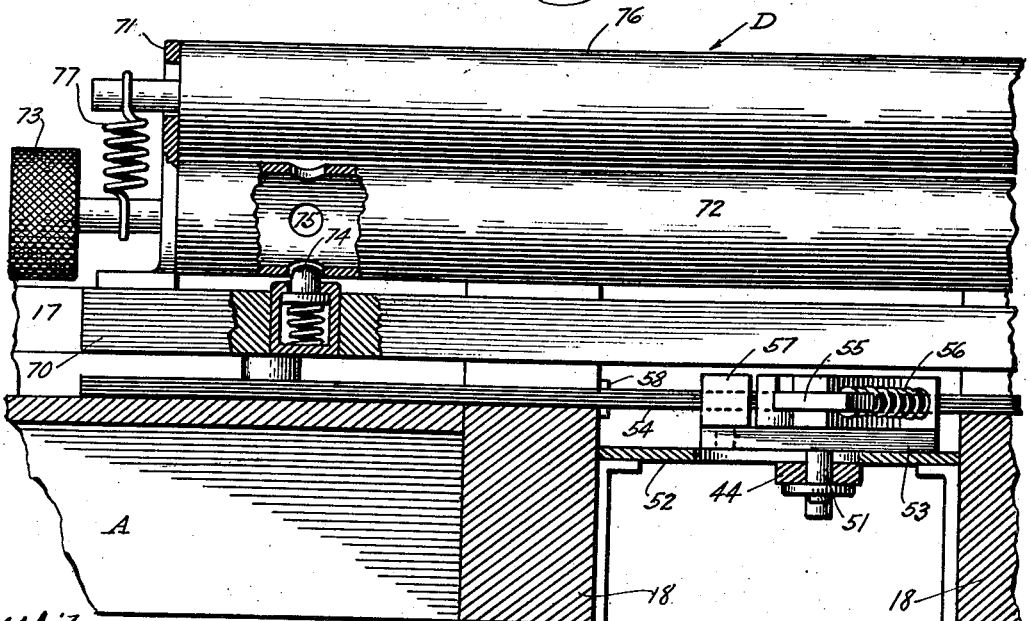

HJALMAR ELMBLAD, OF CHICAGO, ILLINOIS.

WRITING-MACHINE.

1,352,405.	Specification of Letters Patent.	Patented Sept. 7, 1920.

Application filed July 28, 1919. Serial No. 313,678.

*To all whom it may concern:*

Be it known that I, HJALMAR ELMBLAD, a citizen of the United States, residing at Chicago, in the county of Cook and State of Illinois, have invented new and useful Improvements in Writing-Machines, of which the following is a specification.

This invention relates to a machine especially adapted to selectively print comparatively large letters or characters one at a time.

It is the principal object of this invention to provide a simple, compact, and easily manipulated machine adapted to print signs, display cards, bulletins, and the like. Another object of this invention is to provide means for spacing between letters or characters, which will move the paper being printed upon distances corresponding to the proper spacing for the various letters of the alphabet and the other characters to be printed. It is a further object of this invention to provide a machine so arranged that the type carrier may be quickly and expeditiously changed to permit the use of type of different styles and sizes.

These objects will be more fully understood as will also other objects and corresponding accomplishments of my invention from the following detailed description of a preferred embodiment thereof. For the purpose of this description, reference is had to the accompanying drawings, in which:

Figure 1 is a side elevation of a complete machine; Fig. 1ª is a fragmentary view of a portion of the type wheel and frame arm with the copy holder lowered; Fig. 2 is a front elevation of the complete machine; Fig. 2ª is a front elevation of the spacer arm and finger; Fig. 3 is a side elevation in vertical section; Fig. 4 is a section taken on the line 4—4 of Fig. 3; Fig. 5 is a section similar to Fig. 4, but showing the spacing arm lever in another position; Fig. 6 is a plan view of the spacer arm as seen on the line 6—6 of Fig. 3; Fig. 7 is a plan view of the clutch mechanism for moving the paper carriage as seen on the line 7—7 of Fig. 3; Fig. 8 is a view similar to Fig. 7 showing the clutch in another position; Fig. 9 is a perspective view of the front end of the spacer arm, the locking plate, and the mask for the type; Fig. 10 is a detail view in section showing a portion of the type wheel and the spacing mechanism; Fig. 11 is a view similar to Fig. 10 showing the spacing finger in locked position; Fig. 12 is a fragmentary developed view of the periphery of the type wheel; Fig. 13 is an enlarged detail view of the clutch for moving the paper carriage; Fig. 14 is a section taken on the line 14—14 of Fig. 13; Fig. 15 is a section taken on the line 15—15 of Fig. 13; and Fig. 16 is a fragmentary front elevation partly in section showing details of the paper carriage.

Broadly the machine comprises a wheel carrying type on its periphery, which may be depressed, when the proper type is in registry for printing. A carriage for paper is provided with suitable mechanism for advancing the paper under the wheel.

The table which supports the mechanism and upon which the paper rests is indicated by A. Mounted on the table is a standard frame B. The latter supports a type wheel C in such a manner that it may be rotated, depressed and elevated in a vertical plane for making the printing impression. The paper is moved over the table by means of a carriage D, and the carriage is actuated by a spacing mechanism generally indicated by E.

Referring particularly to Figs. 1, 2, and 3, the table A comprises a top 17 supported upon sills 18 which extend from the front to the back of the table. Extending transverse of the table is a way 19, best shown in Figs. 7 and 8, for guiding the paper carriage in its transverse movement.

Mounted upon the table is the standard B for carrying the type wheel and spacing mechanism. This standard comprises a hollow upright arm 20, which is provided with a hollow forwardly extending arm 21. Secured to the forward end of the arm 21 and depending therefrom is a plate 22. Formed in plate 22 and registering with the bore in arm 21 is a slot 23, see Figs. 2 and 3, in which rides a slide block 24. Slide block 24 is mounted upon a shaft 25, upon which the type wheel is journaled. Secured to shaft 25 and upstanding therefrom is a pin 26 for engagement by the copy holder mechanism. Secured to the lower side of the shaft 25 and extending through an opening in arm 21 is a pin 27 for operation of the spacing arm lever. Disposed adjacent the rear end of shaft 25 and secured to the under side thereof is a link 28. The end of shaft 25 has secured thereto a fork embracing a shaft 30. The latter is rotatably mounted in the bore in arm 20 and projects below the table top. A thrust collar 29 is secured to the top of shaft 30.

Formed on the lower side of arm 21 is bracket 31 carrying a pivot pin upon which is mounted a bell crank lever 32 having one arm engaged with pin 27. Pivotally attached to link 28 is a bell crank lever 33 which is mounted upon a bracket 34. Securing the other arms of bell crank levers 32 and 33 is a rod 35. Disposed between brackets 31 and 34 is a bracket 38 having a link 36 on the end of which is secured a collar 37 slidably mounted upon rod 35. Fixedly secured to rod 35 adjacent lever 32 is a stop collar 37′, and disposed between stop collar 37′ and sliding collar 37 is a compression spring 39. This construction provides for depressing and elevating the type wheel shaft 25 with a straight line motion. Spring 39 resists the downward movement of shaft 25, and, after pressure is released therefrom, restores the shaft to its upper position.

The wheel C is disposed with its plane in a vertical position and is journaled upon the shaft 25. A screw 40 holds a washer 41 in position upon the end of shaft 25, thereby preventing displacement of the type wheel. Secured on the hub of the type wheel is a handle 42, by means of which the type wheel may be rotated and depressed for printing. On the face of the rim of the wheel are attached type bearing characters for printing, and marked on the inside in corresponding positions are the characters. Cut into the rim on the rear side of the wheel are spacing notches, one for each character. These notches are for the purpose of properly spacing the letters or characters as they are printed. The spacing is not uniform, varying with the width of the letters, and is hereafter called just spacing to distinguish from uniform spacing. The operation of the notches in coöperation with the other elements of the spacing mechanism will be described later.

Referring particularly to Figs. 3, 7, and 8, an actuating arm 43 is fixedly secured to the shaft 30, so that oscillation of shaft 30 will cause similar movement of arm 43. Pivotally secured to the free end of arm 43 is a finger 44. The pivotal connection between arm 43 and finger 44 is of the rule-joint type, permitting movement of the finger only in one direction with respect to the arm. This joint is provided by connecting finger 44 and arm 43 with a pivot pin 45. Arm 43 is reduced in width at the forward end by cutting away one side thereof, and a pin 46 is secured to finger 44 so that it will abut the side of the reduced portion. Thus, finger 44 may move in the direction indicated by the dotted lines in Fig. 7, but due to the pin 46 it cannot swing about arm 43 in the opposite direction. Tending to hold the finger 44 in its straight line position with respect to the arm 43 is a leaf spring 47 which is attached at one end to the arm 43 and woven about a pin 48 fixed to the arm 43, and a pin 49 fixed to the finger 44. Finger 44 is provided with an elongated opening 50 at its forward end, in which is disposed the pin 51 of a clutch.

The clutch is best shown in Figs. 13, 14, 15, and 16. It is slidably supported upon a base plate 52 which spans the middle sills 18 of the table, and is disposed below an opening in way 19. The clutch comprises a slide block 53 engaging a rail 54 which is secured to the paper carriage. Pivotally secured to the block 53 is a dog 55 for biting into the rail 54. The dog is held in engagement with rail 54 by means of a compression spring 56. One end of the block 53 is undercut, is formed to project under and be spaced from the rail 54. Pivotally secured to the undercut portion of the slide block is a brake 57. This brake slidably engages the rail 54 but has some clearance so that it may rock a slight amount and grip the rail. In order to move the brake into locking position, a button 58 is secured to a sill 18 in such position that it may come into engagement with the free end of the brake, as shown in Fig. 7. Referring to Figs. 7 and 8, when the clutch is moved in the direction of the arrows, the dog 55 will bite into the rail and move the rail in the direction of the arrow. When the clutch reaches its extreme position, brake 57 will engage the button 58 and rock the former into position gripping the rail and preventing further movement. Due to the position of the dog, the clutch may slide on the rail in the direction opposite to the arrow. The distance that the rail and paper carriage is moved upon each oscillation of the arm 43 is dependent upon the distance to which the clutch is moved as it slides along the rail. The arm 43 is moved by a spring 59 attached to one sill, and is returned by oscillating shaft 30 in the opposite direction. This is performed by movement of a spacing arm 60 which extends through an opening in the arm 20 of the standard and projects forwardly above the table. The forward end of the spacing arm 60 is formed with a bracket 61 to which is pivotally attached a spacing finger 62 adapted to enter the notches 43 on the type wheel. The finger 62 has a loop 63 engaged by a leaf spring 64 tending to hold the finger in outer position against a stop pin 65 mounted upon the bracket 61. Arm 60 is restrained against such movement by a lever 66 pivotally secured to plate 22. Arm 66 is of bell crank form, the upper end being hooked over an arm of bell crank lever 32. Upon downward movement of the shaft 25, pin 27 moves downwardly into the position shown in Fig. 5. This permits the upper arm of lever 32 to be moved downwardly and spacing arm 60 to swing out. Upon the return of shaft 25 to its upper position, the upper arm of lever 32 forces the upper arm of lever 66 into the position shown in Fig. 4. This causes the lever 66 to return arm 60 to its central position. The top of finger 62 is inclined and the finger in its outer position, when the type wheel is raised, will be disposed underneath the latter as shown in Figs. 1 and 3. Upon the depression of the type wheel to print, the edge of the rim engages the top of the finger and forces the latter inwardly as shown in Fig. 10. However, when a spacing notch registers with the end of the finger, the latter will be forced therein by the spring 64, as shown in Fig. 11. Formed upon the front of the plate 22 is a locking lug 67.

In order to print a letter, the latter should be in exact position. A spacing notch for each letter is located at a uniform distance from the front of each letter. Thus to print an R, the corresponding type should be in position so that its notch registers with the locking lug 67, whereupon the wheel may be depressed, the lug riding into the notch and securely locking the wheel against rotation. The rim of the wheel partially conceals the locking lug from the view of the operator. In order to make registration of the spacing notch and locking lug easy of accomplishment by the operator, an indicating pin 67' is disposed immediately above the locking lug in such position that it is inside of the rim of the wheel. If the proper spacing notch and the indicator pin are in alinement, then the locking lugs will also be in alinement.

A movable mask prevents other letters from those to be printed from making an impression. Referring to Fig. 9 a bracket arm 68 is secured to the bracket head 61 of arm 60 that carries at the lower end a curtain. The curtain moves with the spacing arm and adjusts the position according to the width of the face of the type to be printed.

The tympan 69 is mounted upon the top of the table and beneath the type wheel. This tympan may be of any suitable construction to coöperate with the type on the wheel and make suitable impressions upon the paper.

Referring particularly to Fig. 16, the paper carrier comprises a base 70 to which is secured the rail 54. The base bar 70 rides upon the bottom of the way 19, the rail 54 being disposed in a groove formed in the bottom of the way. The way is open between the central sills 18 to permit the clutch to operate thereon. Disposed upon the end of the bar 70 are the bearing brackets 71. Alined openings are formed adjacent the lower ends of the brackets and journaled in these openings is a roller 72.

The trunnions for roller 72 extend beyond the bearing brackets and secured thereto are knobs 73 for turning the roller. Free movement of the roller may be retarded by any suitable means. A spring lock means which assists in indicating uniform movement of the paper is provided. The spring lock consists of a detent 74 which engages in spaced openings 75 in the roller. The roller may be covered with some non-slip material so that it will firmly engage the paper. If desired, rubber rings may be placed over the roller. Disposed above roller 72 is a roller 76. The trunnions of roller 76 pass through elongated openings in the brackets 71 so that roller 76 may have a slight movement to and from roller 72 to accommodate it to paper of different thicknesses. Holding roller 76 against roller 72 are tension springs 77, which hook over the trunnions on rollers 72 and 76. The line of contact between the rollers is about level with the top of the table. Paper to be printed upon is fed between the rollers and moved from the front to the back of the table. The paper may thus be advanced a line or more at a time. The paper is moved transversely of the table by means of the clutch.

The spacing notches on the wheel are uniformly the same distance from the fore part or beginning of each letter. However, the spacing notches are exactly or properly spaced between letters, varying according to the width of each letter. When it is desired to print a letter such as I, the printing wheel is rotated until the space for the type I registers with the locking lug 67. This is done by grasping the handle 42 and turning the wheel until the letter I marked on the inside of the rim, see Fig. 3, registers with the indicating pin 68. The printing wheel is now depressed, the spacing finger 62 being forced inwardly as shown in Fig. 10. At the same time the lever 66 is moved so as to permit spacing arm 60 to swing outwardly. As soon as the spacing finger registers with the next notch which is the notch for the letter J, the finger slips into the latter as shown in Fig. 11. This locks the spacing arm against further movement. Movement of the spacing arm will have permitted spring 59 to move the clutch arm 43 and thereby move the clutch along the rail 54 into the position shown in Fig. 8. Upon return of the type wheel to its upper position, the lever 66 returns the spacing arm 60 to central position. The clutch is moved into the position shown in Fig. 7, and with it the rail 54, as the latter grips it. When the clutch reaches the end of its travel, brake 57 is engaged by button 58 and locked against further movement. The space for the letter I is determined by the distance between the notches opposite the letters I and J. When printing the letter M, the spacing arm moves over the notch opposite N. This distance corresponds with the space for the letter M which is different from that for I.

In order to damp the movement of the clutch along the rail and prevent the finger 44 from being thrown beyond the desired point of travel, which might occur because of the inertia of the parts, a pneumatic buffer is provided. This comprises a connecting rod 78 secured to the pin 51 on the under side of the clutch block 53. Connecting rod 78 is secured to a plunger which operates in a cylinder 79. Thus, an air buffer is provided.

Inking is provided for by means of inking rollers bearing against the type. Secured to the upper arm of standard B is an arm 80, upon the end of which is secured a frame 81. Frame 81 carries inking rollers bearing against the face of the type. Any other suitable means for inking the rollers may be used.

It will be noted, especially from an inspection of Fig. 3, that the type wheel may be changed. Thus, the characters of a different style may be used, or a greater or lesser number of characters may be used. By means of this construction an operator may have several different wheels so that he can change the style of the type used as desired. To remove the type wheel, the handle 42 is detached from the hub of the wheel, and the screw 40 removed. This permits the wheel to be slipped from the shaft 25. In order to place the wheel in position to be removed it should be depressed sufficiently to clear the ink rollers. This is accomplished by means of the copy holder. Secured to the arm 21 of the frame is a bracket 82. Pivotally mounted in the bracket is a foot 83 from which rises a leg 84 carrying at the upper end means for grasping a copy. The foot 83 is arranged so that when the copy holder is swung into horizontal position as shown in Fig. 1ª, it will engage the pin 26, thereby depressing the type wheel a limited amount. The type wheel in this position clears both the ink rollers and the tympan.

Means must also be provided for moving the paper carriage to space between words, or to otherwise space when desired. This may be accomplished by swinging the clutch finger 44 to the right from the position shown in Fig. 7, then releasing the finger and permitting the spring 47 to return the latter. For the purpose of conveniently operating the finger 44 a bar 85 is secured thereto and extended to one side of the table convenient for the operator to reach. The bar 85 may be provided with a knob 86 as shown in Fig. 2. This is only one means which may be used for spacing and moving the carriage. This means is shown for illustrative purposes only.

What I claim is:

1. In a printing machine, the combination of a base; a movable carriage for paper thereon; a rotatable type wheel movable so as to be depressed and engage said paper for printing, said type wheel having spacing notches on the rim thereof corresponding to just spacing; spacing means comprising a horizontally pivoted arm having a finger to engage with said notches, means tending to swing said arm, means to permit movement of said arm upon depression of said wheel and to return said arm upon elevation of said wheel, and a clutch for moving said carriage in one direction connected to said arm.

2. In a printing machine, the combination of a base; a movable carriage for paper thereon; a rotatable type wheel movable so as to be depressed and engage said paper for printing, said type wheel having spacing notches on the rim thereof corresponding to just spacing; spacing means comprising a horizontally pivoted arm, a vertically pivoted finger on the end of said arm to engage with said notches, means tending to swing said arm, means to permit movement of said arm upon depression of said wheel and to return said arm upon elevation of said wheel, and a clutch for moving said carriage in one direction connected to said arm.

3. In a printing machine, the combination of a carriage for paper; a rotatable type wheel vertically movable into engagement with the paper for printing, said type wheel having spacing notches on the rim thereof corresponding to just spacing; a locking lug for engagement with a notch to prevent turning of said wheel when in printing position; and spacing means comprising a horizontally movable arm having a finger to engage said notches on printing movement of said wheel and thereby control the movement of said carriage.

4. In a printing machine, the combination of a base; a movable carriage for paper thereon; a rotatable type wheel vertically movable into engagement with the paper for printing, said type wheel having spacing notches on the rim thereof corresponding to just spacing; a locking lug for engagement with a notch to prevent turning of said wheel when in printing position; and spacing means for moving said carriage comprising a horizontally movable arm having a finger to engage said notches on printing movement of said wheel, and a clutch for moving said carriage in one direction.

5. In a printing machine, the combination of a base; a movable carriage for paper thereon; a rotatable type wheel movable so as to be depressed and engage said paper for printing, said type wheel having spacing notches on the rim thereof corresponding to just spacing; a locking lug for engagement with a notch to prevent turning of said wheel when in printing position; spacing means comprising a horizontally pivoted arm having a finger to engage with said notches, means tending to swing said arm, means to permit movement of said arm upon depression of said wheel and to return said arm upon elevation of said wheel, and a clutch for moving said carriage in one direction connected to said arm.

6. In a printing machine, the combination of a base; a movable carriage for paper thereon; a rotatable type wheel movable so as to be depressed and engage said paper for printing, said type wheel having spacing notches on the rim thereof corresponding to just spacing; a locking lug for engagement with a notch to prevent turning of said wheel when in printing position; spacing means comprising a horizontally pivoted arm, a vertically pivoted finger on the end of said arm to engage with said notches, means tending to swing said arm, means to permit movement of said arm upon depression of said wheel and to return said arm upon elevation of said wheel, and a clutch for moving said carriage in one direction connected to said arm.

7. In a printing machine, the combination of a base; a movable carriage for paper thereon; a rotatable type wheel movable into engagement with the paper for printing; and spacing means for moving said carriage comprising a spacing arm operated by printing movement of said wheel, an actuating arm fixed thereto, a finger pivotally secured to said actuating arm by a rule-joint connection, and a clutch for moving said carriage in one direction secured to said finger.

In witness that I claim the foregoing I have hereunto subscribed my name this 12th day of July, 1919.

HJALMAR ELMBLAD.